UNITED STATES PATENT OFFICE.

WILLIAM PRESCOTT, OF ALBANY, NEW YORK.

IMPROVEMENT IN PIGMENTS.

Specification forming part of Letters Patent No. 207,773, dated September 3, 1878; application filed May 11, 1878.

*To all whom it may concern:*

Be it known that I, WILLIAM PRESCOTT, of the city and county of Albany, and State of New York, have invented certain new and useful Improvements in the Manufacture of Pigmentary Compounds for Imparting Colors to Paints, of which the following is a full and exact description.

My invention relates to the manufacture of dry colors for producing imitations of the shades of color hereinafter named; and it consists in a composition formed by mixing with a base prepared from common black slate-rock, hereinafter mentioned, sienna, either in a burned or raw state, or any equivalent colors, substantially in the proportions prescribed in the formulæ given below.

The object of my invention is to produce inexpensive substitutes for the genuine pigments named.

In carrying out my invention I use as a base for the compounds for the colors hereinafter named the slate-rock known as "Utica slate," described in the "Natural History of New York—Geology, Third District," edition of 1842-3, page 56, as a "rock, when unaltered, of a deep bluish-black, generally fissile." It is found in great abundance in the Mohawk Valley of the State of New York. A similar formation, known as "Genesee slate," described on page 168 of the work above referred to, and found in the Chenango Valley of the same State, may be substituted for the Utica slate when desired, and the same results produced thereby. This class of rock is so easily removed from its native beds that the cost of procuring the crude material is but nominal. This material, without undergoing any preparatory operation, is reduced to a fine powder by grinding, which, from its peculiar nature, is readily accomplished at a slight cost. In its pulverulent state, when unmixed with other materials, it has a dark slate-colored hue. The advantages which this rock, when ground, possesses over others as a basis for oil-paint are that its color is brighter, less changeable on exposure, and wears better, working freer than pure umber and Vandyke brown, not cracking or scaling off by exposure.

After the base is prepared as above set forth, and while dry, I mix it according to the following formulæ, to produce the colors named, all the parts given being by weight, while the materials are in a dry powdered condition: For Vandyke brown, seven parts of slate-rock base and one part of burnt sienna; for burnt umber, two parts of slate-rock base and one part of burnt sienna; for raw umber, equal parts of slate-rock base and raw sienna. In these formulæ Venetian red may be substituted for the burnt sienna, and yellow ocher for the raw sienna, in the proportions given, without materially affecting the colors produced.

These compounds may be used with any of the ingredients commonly employed for preparing paint for use, either as oil-colors or as distemper.

I claim as my invention—

As a new article of manufacture, the pigmentary compound herein described, consisting of a pulverulent mixture of the Genesee slate-rock, herein named, and sienna, either raw or burned, substantially in the proportions specified.

WILLIAM PRESCOTT.

Witnesses:
   WILLIAM H. LOW,
   C. J. MATTISON.